(12) United States Patent
Yudasaka et al.

(10) Patent No.: US 7,813,593 B2
(45) Date of Patent: Oct. 12, 2010

(54) DISPLAY OF THUMBNAILS OF IMAGE DATA

(75) Inventors: Shingo Yudasaka, Matsumoto (JP);
Shoichi Nakajo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 912 days.

(21) Appl. No.: 11/706,619

(22) Filed: Feb. 13, 2007

(65) Prior Publication Data

US 2007/0188774 A1 Aug. 16, 2007

(30) Foreign Application Priority Data

Feb. 14, 2006 (JP) ............................. 2006-035993

(51) Int. Cl.
*G06K 9/32* (2006.01)
(52) U.S. Cl. .................. 382/298; 348/333.05; 715/838
(58) Field of Classification Search ............. 348/207.2, 348/333.05; 358/1.1, 1.2, 3.07; 382/298; 708/173; 715/838
See application file for complete search history.

(56) References Cited

U.S. PATENT DOCUMENTS

| | | | |
|---|---|---|---|
| 7,336,775 B2 | 2/2008 | Tanaka et al. | |
| 2002/0054345 A1* | 5/2002 | Tomida et al. | 358/1.15 |
| 2003/0053082 A1* | 3/2003 | Tomito et al. | 358/1.2 |
| 2003/0081225 A1* | 5/2003 | Nakami et al. | 358/1.2 |
| 2004/0032607 A1* | 2/2004 | Ohkuma et al. | 358/1.13 |
| 2005/0212923 A1* | 9/2005 | Aiso | 348/222.1 |
| 2005/0231754 A1* | 10/2005 | Uchida | 358/1.15 |

FOREIGN PATENT DOCUMENTS

| | | |
|---|---|---|
| JP | 2003-118210 | 4/2003 |
| JP | 2003-150928 A | 5/2003 |
| JP | 2004-12633 | 1/2004 |
| JP | 2004-241848 A | 8/2004 |
| JP | 2005-080070 A | 3/2005 |

\* cited by examiner

*Primary Examiner*—Matthew C Bella
*Assistant Examiner*—Gregory F Cunningham
(74) *Attorney, Agent, or Firm*—Nutter McClennen & Fish LLP; John J. Penny, V

(57) ABSTRACT

The display of each thumbnail with an appropriate paper size enables the operator to readily grasp the number of pixels constituting each image data corresponding to the thumbnail. Such display enhances the workability for selection of desired image data. Multiple thumbnails provided for respective image data are displayed as a list in a specific thumbnail display area on a window. The appropriate paper size of each thumbnail is shown on the upper right corner of the thumbnail. The appropriate paper size of each thumbnail is determined to be suitable for the print size for printing the image data corresponding to the thumbnail. The appropriate paper size is the paper size of the greatest dimensions among multiple paper size options stored in a paper size table that are sufficient for printing the image data having a specified number of pixels.

10 Claims, 7 Drawing Sheets

TB PAPER SIZE TABLE

| PAPER SIZE | DIMENSIONS(mm) |
|---|---|
| L | 127 × 89 |
| POSTCARD | 148 × 100 |
| A6 | 148 × 105 |
| 2L | 178 × 127 |
| B5 | 257 × 182 |
| A4 | 297 × 210 |

DISPLAY OF THUMBNAILS OF IMAGE DATA

CROSS REFERENCE TO RELATED APPLICATIONS

The present application claims the priority based on Japanese Patent Application No. 2006-35993 filed on Feb. 14, 2006, the disclosure of which is hereby incorporated by reference in its entirety.

BACKGROUND OF THE INVENTION

1. Field of the Invention

The present invention relates to a technique of displaying thumbnails provided for individual image data.

2. Description of the Related Art

An image editor application program installed in a computer is generally used to process input image data and display an image according to input or processed image data. The image editor program has a function of displaying a list of multiple thumbnails provided for respective image data in a specific window (see, for example, JP 2004-12633A). The operator selects a desired thumbnail among the multiple thumbnails displayed in the window to open and display image data corresponding to the selected thumbnail on the window.

Image data have a wide range of pixel numbers from the high pixel number of image data taken with a digital camera or electronic still camera to the low pixel number of image data taken with a camera-equipped cell phone. The display of multiple thumbnails corresponding to the image data of these varying pixel numbers does not inform the operator of the actual size of each image data. In order to obtain such information, the operator should select a desired thumbnail among the multiple thumbnails displayed in the window and open the image data corresponding to the selected thumbnail. An image size of the opened image data informs the operator of whether the opened image data has the high pixel number or the low pixel number. The prior art thumbnail display accordingly has relatively poor workability for selection of desired image data among multiple image data.

SUMMARY

An object of the present invention is to provide a technology that enables the operator to readily grasp the number of pixels constituting each image data corresponding to each thumbnail and thereby enhances the workability for selection of desired image data.

According to a first aspect of the present invention, there is provided a thumbnail display apparatus that displays a thumbnail provided for each image data. The thumbnail display apparatus includes: an image size acquisition module that obtains a horizontal number of pixels and a vertical number of pixels defining each image data as an image size of the image data; an output resolution acquisition module that specifies an output resolution corresponding to a printing resolution by a printing apparatus; an appropriate paper size determination module that determines an adequate paper size suitable for printing each image data, based on the specified image size of the image data and the specified output resolution; and a display control module that displays a thumbnail provided for each image data, together with the appropriate paper size determined for the image data by the appropriate paper size determination module.

The thumbnail display apparatus determines the appropriate paper size suitable for printing each image data based on the specified image size of the image data and the specified output resolution, and displays a thumbnail provided for each image data together with the determined appropriate paper size. Such thumbnail display informs the operator of the paper size suitable for printing the image data corresponding to each thumbnail. The operator generally has difficulty in understanding the actual size of image data by the number of pixels. The information on the paper size suitable for printing the image data helps the operator grasp the actual size of the image data. The thumbnail display apparatus effectively attains the thumbnail display that enables the operator to readily grasp the number of pixels constituting each image data corresponding to each thumbnail and thereby enhances the workability for selection of desired image data.

According to a second aspect of the present invention, there is provided a thumbnail display method corresponding to the thumbnail display apparatus of the first aspect of the invention described above. The second aspect of the present invention is thus directed to a thumbnail display method of displaying a thumbnail provided for each image data. The thumbnail display method obtains a horizontal number of pixels and a vertical number of pixels defining each image data as an image size of the image data, and specifies an output resolution corresponding to a printing resolution by a printing apparatus. The thumbnail display method determines an adequate paper size suitable for printing each image data based on the specified image size of the image data and the specified output resolution, and displays a thumbnail provided for each image data together with the appropriate paper size determined for the image data.

According to a third aspect of the present invention, there is provided a computer program product that causes a computer to display a thumbnail provided for each image data. The computer program product includes: a first program code of obtaining a horizontal number of pixels and a vertical number of pixels defining each image data as an image size of the image data; a second program code of specifying an output resolution corresponding to a printing resolution by a printing apparatus; a third program code of determining an adequate paper size suitable for printing each image data, based on the specified image size of the image data and the specified output resolution; a fourth program code of displaying a thumbnail provided for each image data, together with the appropriate paper size determined for the image data; and a computer readable medium that stores the first through the fourth program codes.

Like the thumbnail display apparatus of the first aspect of the invention, the thumbnail display method of the second aspect of the invention and the computer program product of the third aspect of the invention effectively attain the thumbnail display that enables the operator to readily grasp the number of pixels constituting each image data corresponding to each thumbnail and thereby enhances the workability for selection of desired image data.

Another application of is a program supply device that supplies the computer program via a communication path. For example, the computer program may be located in a specific server on a computer network and downloaded into a computer via the communication path to be executed and actualize the thumbnail display apparatus or the corresponding thumbnail display method described above.

DESCRIPTION OF THE PREFERRED EMBODIMENTS

Figure 1:
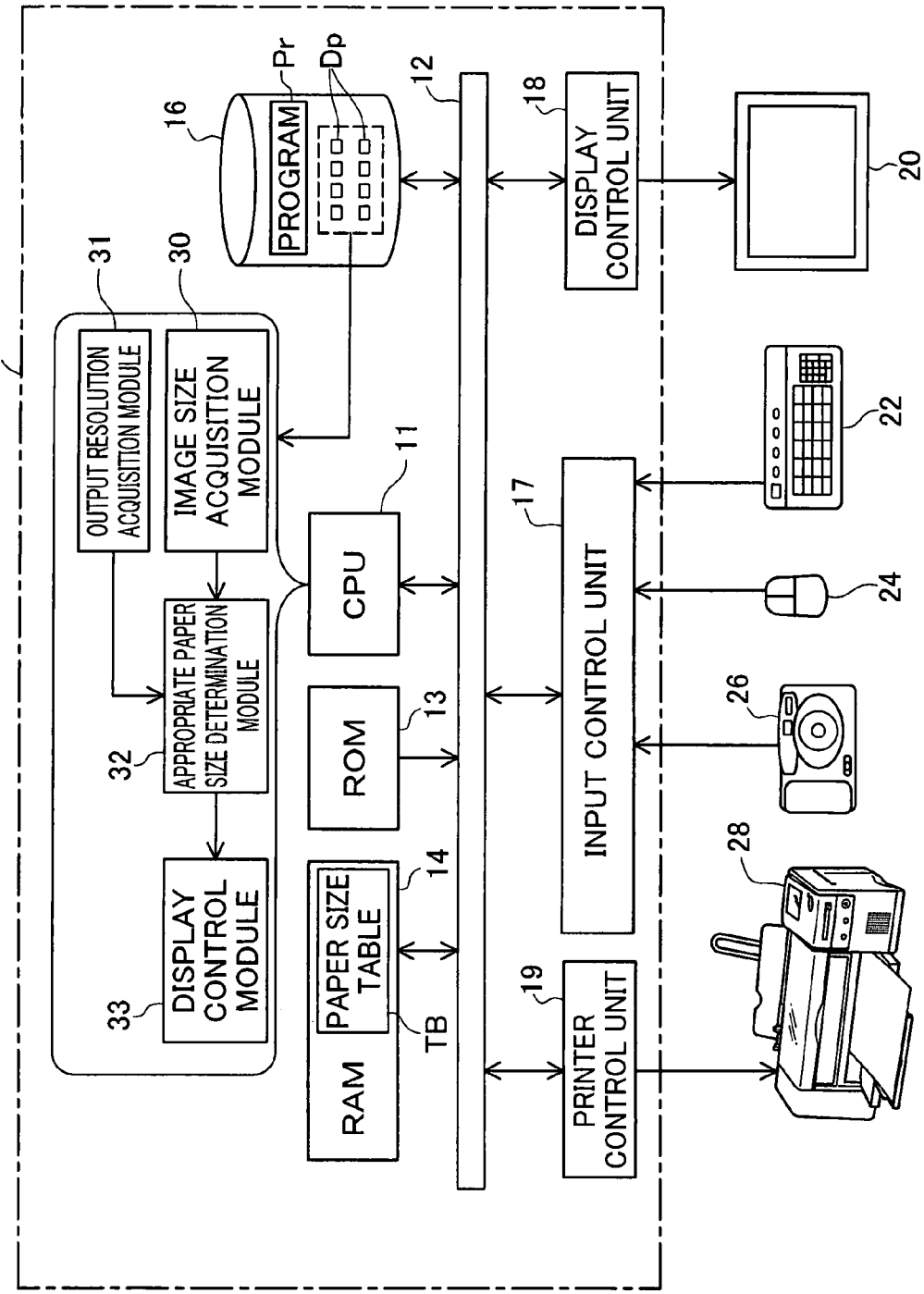
FIG. 1 schematically illustrates the configuration of a computer system in one embodiment of the invention.

One mode of carrying out the invention is described below in the following sequence as a preferred embodiment with reference to the accompanied drawings:

A. System Configuration
B. Screen Display
C. Computer Processing
D. Functions and Effects
E. Modifications A. System Configuration FIG. 1 schematically illustrates the configuration of a computer system in one embodiment of the invention. The computer system of the embodiment has a personal computer 10 as a thumbnail display apparatus of the invention and further includes a display 20, a keyboard 22, and a mouse 24 as peripheral equipment. The personal computer 10 is connected with a digital camera 26 and a printer 28.

The personal computer 10 has a CPU (central processing unit) 111, a ROM (read only memory) 13, a RAM (random access memory) 14, a hard disk drive 16, an input control unit 17, a display control unit 18, and a printer control unit 19 that are interconnected via a bus 12. The only-readable ROM 13 stores various programs installed in the personal computer 10, and the readable and writable RAM 14 stores various data. The hard disk drive 16 stores a computer program Pr executed as software of the thumbnail display apparatus. The hard disk drive 16 also stores a large number of image data Dp of (color) photographic images taken with the digital camera 26, as well as diverse image data of various numbers of pixels, for example, photographic images taken with a camera-equipped cell phone. A paper size table TB stored in the RAM 14 will be described later.

The input control unit 17 receives commands in response to the operator's input operations of the keyboard 22 and the mouse 24 and controls input of image data from the digital camera 26. The display control unit 18 controls display of image data on the display 20. The printer control unit 19 controls printing operations by the printer 28.

The printer 28 of this embodiment is an inkjet printer to print images by spray jet of various color inks and is equivalent to a printing apparatus of the invention. The printer 28 is not restricted to the inkjet printer but may be any other suitable printer of different printing principle, for example, a laser printer or a thermal transfer printer.

In this embodiment, the computer program Pr is stored in a CD-ROM (not shown) as a recording medium and is installed from the CD-ROM into the hard disk drive 16 on activation of a specific installation program. The CPU 11 executes the computer program Pr to perform required functions of the thumbnail display apparatus of the invention. The respective functions of the CPU 11 are shown as functional blocks in FIG. 1 and include an image size acquisition module 30, an output resolution acquisition module 31, an appropriate paper size determination module 32, and a display control module 33 to display thumbnails provided for the respective image data Dp.

The computer program Pr is an application program for photo retouching. A specific part of the computer program Pr causes the personal computer 10 to perform the respective functions of the image size acquisition module 30, the output resolution acquisition module 31, the appropriate paper size determination module 32, and the display control module 33.

The computer program Pr may be stored in and installed from any portable or mobile recording medium other than the CD-ROM, for example, a flexible disk, a magneto-optical disk, or an IC card. The computer program Pr may otherwise be downloaded from a specific server via an external network. For example, the network is the Internet, and the computer program Pr is downloaded from a specific homepage. The computer program Pr may be received as an attachment file of an electronic mail.

B. Screen Display

Figure 2:
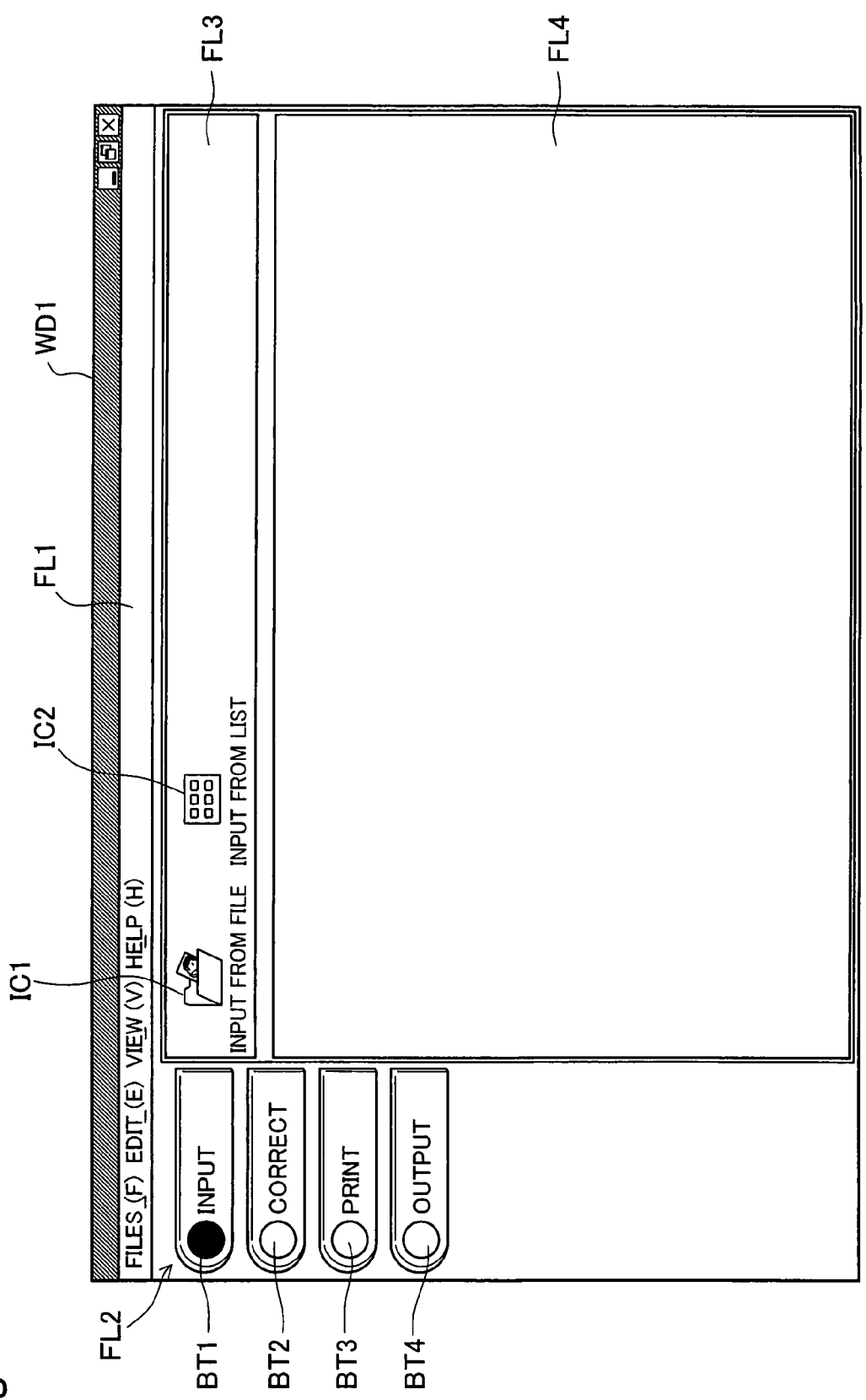
FIG. 2 shows the initial state of an application window WD1 opened on a display according to a computer program Pr.

FIG. 2 shows the initial state of an application window WD1 opened on the display 20 according to the computer program Pr. The application window WD1 is given as a graphical user interface (GUI) and includes a menu bar FL1, a processing menu option field FL2, a tool bar FL3, and a work area FL4. The processing menu option field FL2 has four option buttons BT1 'Input', BT2 'Correct', BT3 'Print', and BT4 'Output' vertically arranged in this sequence. The operator clicks these option buttons BT1 through BT4 in this sequence in the application window WD1 on the display 20 with the mouse 24 to successively input image data of photographic images taken with the digital camera 26, correct the input image data, print images according to the corrected image data, and output (store) the corrected image data.

In the initial state of the application window WD1 shown in FIG. 2, the option button BT1 'Input' is selectively active to show two icons IC1 'Input from File' and IC2 'Input from List' in the tool bar FL3. In response to the operator's click of the icon IC2 'Input from List', an 'Input from List' window WD2 is opened on the display 20.

Figure 3:
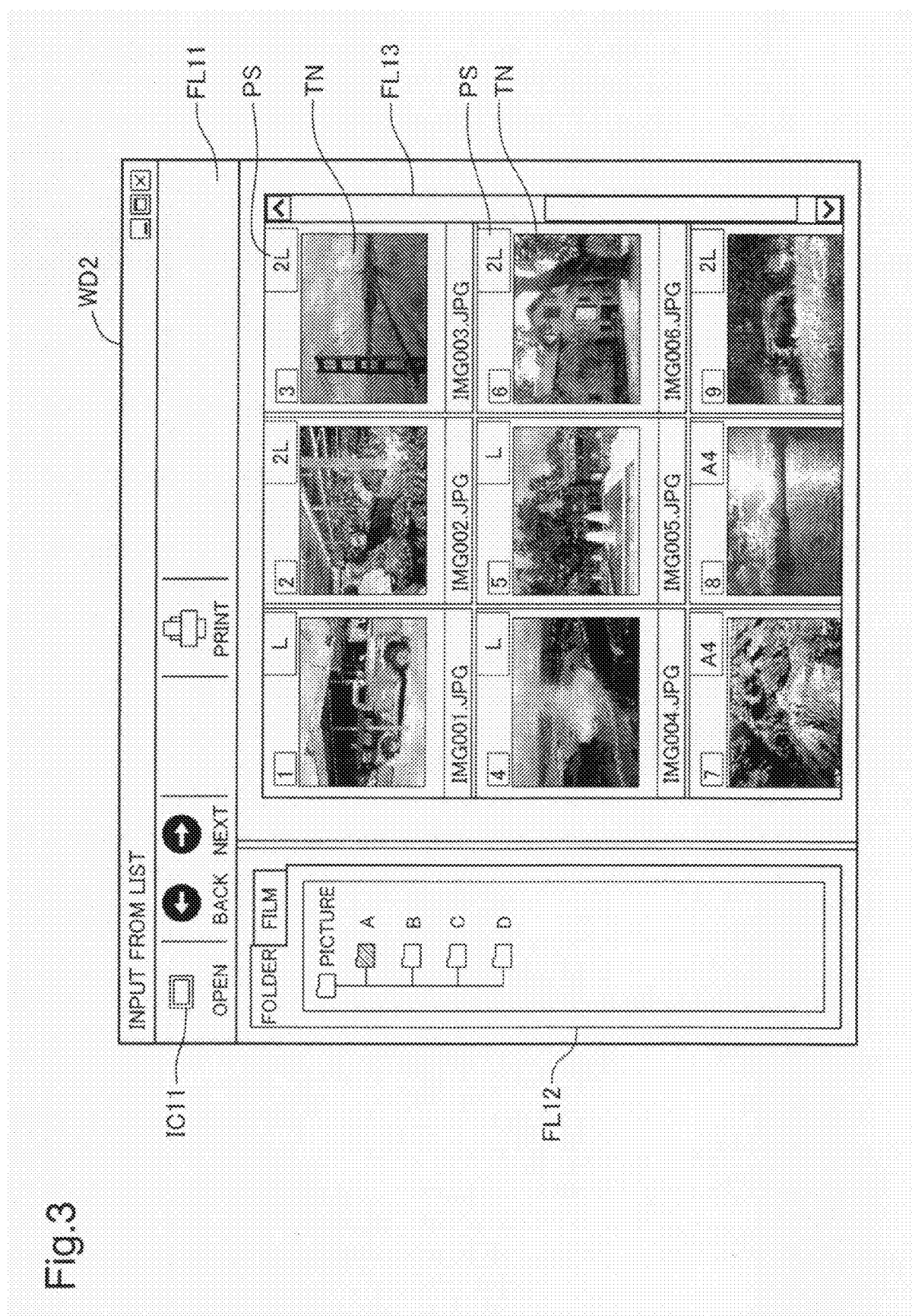
FIG. 3 shows an 'Input from List' window WD2 opened on the display.

FIG. 3 shows the 'Input from List' window WD2 opened on the display 20. The 'Input from List' window WD2 includes a tool bar FL11, a file specification field LF12, and a thumbnail display area FL13. The file specification field FL12 shows available folders and available films to enable the operator's specification of the storage location of desired image data Dp with the mouse 24. The storage location of image data Dp specified by the operator may be inside the hard disk drive 16, on a portable recording medium like a CD-ROM, or on a recording medium set in the digital camera 26. The thumbnail display area FL13 displays a list of thumbnails representing multiple image data Dp stored in either a folder or a film selected by the operator in the file specification field FL12.

When the operator selects a desired folder or a desired film in the file specification field FL12, multiple thumbnails of multiple image data Dp stored in the selected folder or the selected film are displayed in the thumbnail display area FL13. The operator selects a desired thumbnail among the multiple thumbnails displayed in the thumbnail display area FL13 and clicks an icon IC11 'Open' provided on the toll bar FL11. Object image data Dp of the operator's selected thumbnail is then shown in the full size in the work area FL4 on the application window WD1 of FIG. 1. The operator clicks the option button BT2 'Correct' to perform color correction of the object image data Dp in the work area FL4, clicks the option button BT3 'Print' to print the color-corrected object image data Dp, and clicks the option button BT4 'Output' to store the color-corrected object image data Dp into the hard disk drive 16.

C. Computer Processing

Figure 4:
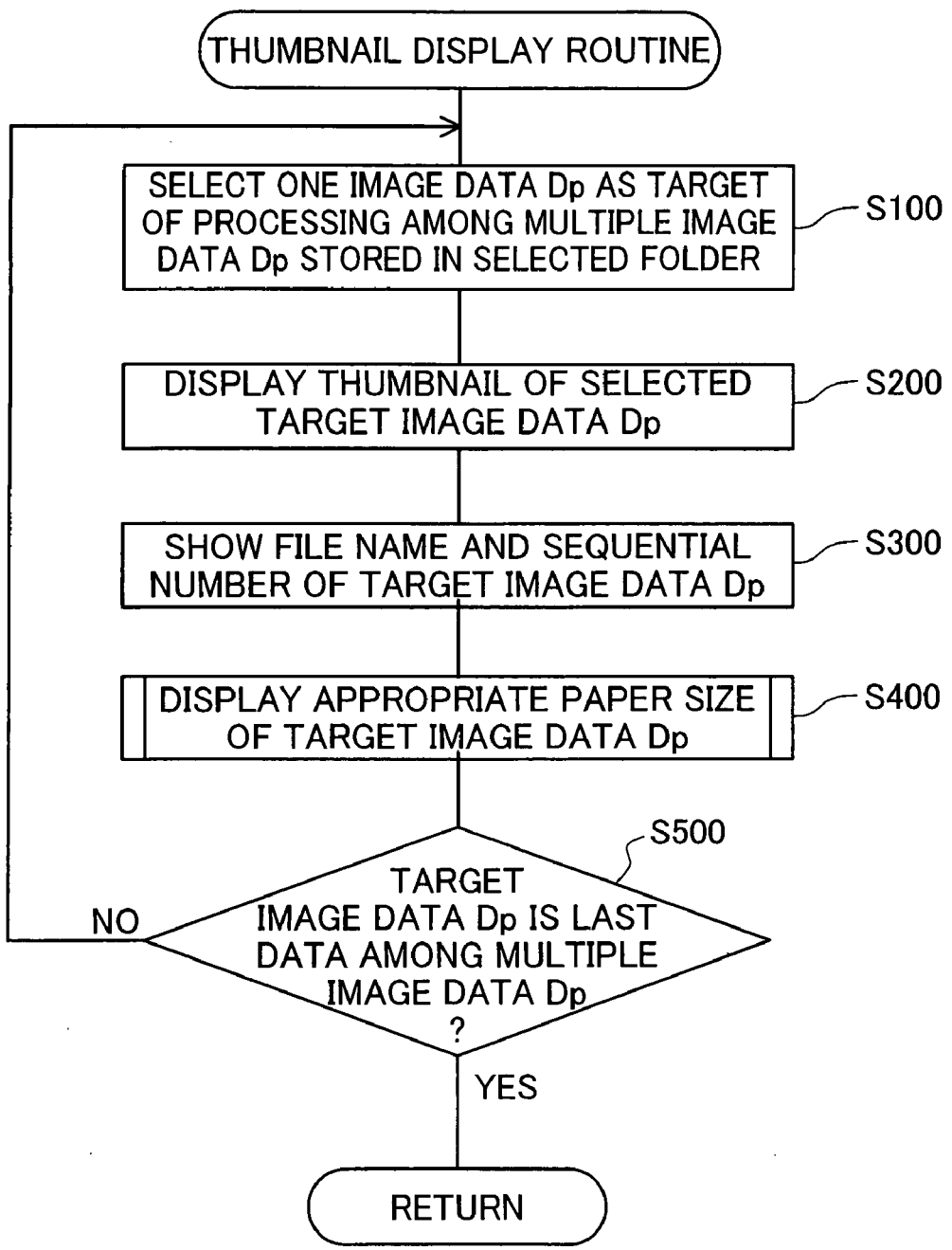
FIG. 4 is a flowchart showing a thumbnail display routine to display a list of thumbnails in a thumbnail display area FL13 on the 'Input from List' window WD2.

FIG. 4 is a flowchart showing a thumbnail display routine to display a list of thumbnails in the thumbnail display area FL13 on the 'Input from List' window WD2. The thumbnail display routine is executed by the CPU 11 in response to the operator's click of the icon IC2 'Input from List'. On the start of the thumbnail display routine of FIG. 4, the CPU 11 first selects one image data Dp as a target of processing among multiple image data Dp stored in a folder or a film selected by the operator in the file specification field FL12 (step S100). A thumbnail provided for the selected image data Dp is then displayed in the thumbnail display area FL13 (step S200).

Image files input from the digital camera 26 are generally in the Exif format. Each image file of image data Dp in the Exif format has thumbnail data representing a thumbnail of the image data Dp. The thumbnail of the selected image data Dp is displayed according to this accompanying thumbnail data at step S200. The display of thumbnails in the thumbnail display area FL13 is not restricted to the image data input from the digital camera 26 but may be any image data in any of various data formats stored in the operator's selected folder or film. When the selected image data does not have thumbnail data, the CPU 11 contracts the selected image data to generate and display a corresponding thumbnail at step S200.

The CPU 11 shows a file name and a sequential number of the target image data Dp selected at step S100 (step S300) and displays an appropriate paper size of the selected target image data Dp (step S400).

Figure 5:
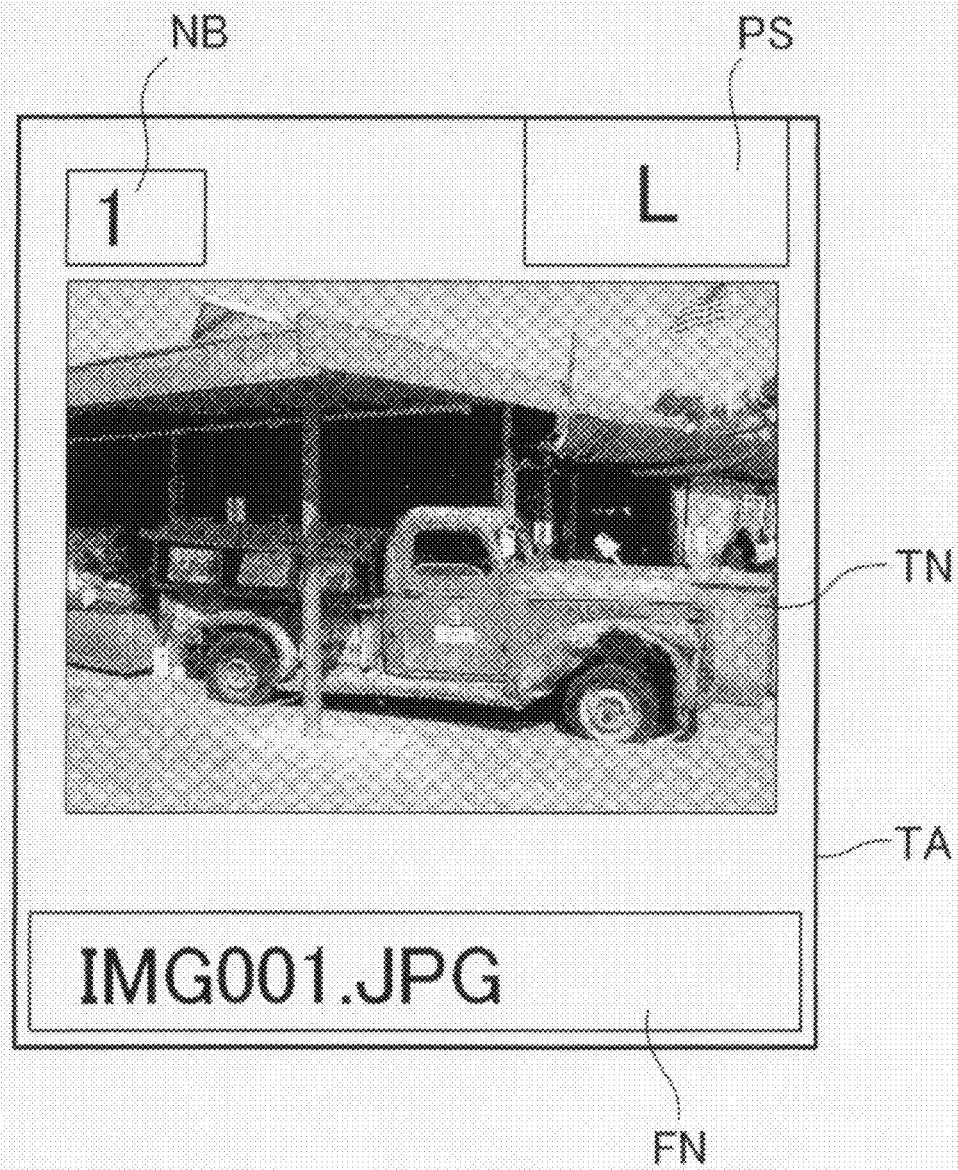
FIG. 5 shows one example of display by the processing of steps S200 to S400 in the thumbnail display routine of FIG. 4.

FIG. 5 shows one example of display by the processing of steps S200 to S400 in the thumbnail display routine of FIG. 4. A display area TA is allocated for display of each thumbnail. A thumbnail TN of the selected target image data Dp is displayed in the middle of the display area TA at step S200. A file name FN and a sequential number NB of the selected image data are shown respectively below the thumbnail TN and on the upper left corner of the thumbnail TN at step S300. An appropriate paper size PS is displayed on the upper right corner of the thumbnail TN at step S400. The sequential number NB is allocated in an ascending order starting from '1' to each thumbnail TN displayed in the thumbnail display area FL13. The display of the appropriate paper size PS at step S400 is characteristic of the invention and is described later in detail.

In the thumbnail display routine of this embodiment, the sequential number NB, the file name FN, and the appropriate paper size PS are shown with regard to each thumbnail TN displayed in the display area TA. All these attribute data are, however, not essential, and only the appropriate paper size PS may be shown with regard to each thumbnail TN. The display position of the appropriate paper size PS is on the upper right corner of the thumbnail TN in the illustrated example. This display position is, however, not essential, and the appropriate paper size PS may be displayed on the upper left corner of the thumbnail TN or below the thumbnail TN. Namely the display position of the appropriate paper size PS may be any location in the periphery of the thumbnail TN.

On completion of the appropriate paper size display at step S400, the CPU 11 determines whether the target image data Dp selected at step S100 is the last data among the multiple image data Dp stored in the operator's selected folder or film (step S500). When the target image data Dp is not the last data (step S500: no), the thumbnail display routine goes back to step S100 to select another image data Dp as a next target of processing among the multiple image data Dp stored in the selected folder or film. When the target image data Dp is the last data (step S500: yes), on the other hand, it is determined that display of thumbnails has been completed for all the image data Dp stored in the folder or film selected in the file specification field FL12. The CPU 11 accordingly goes to Return and terminates the thumbnail display routine of FIG. 4.

Figure 6:
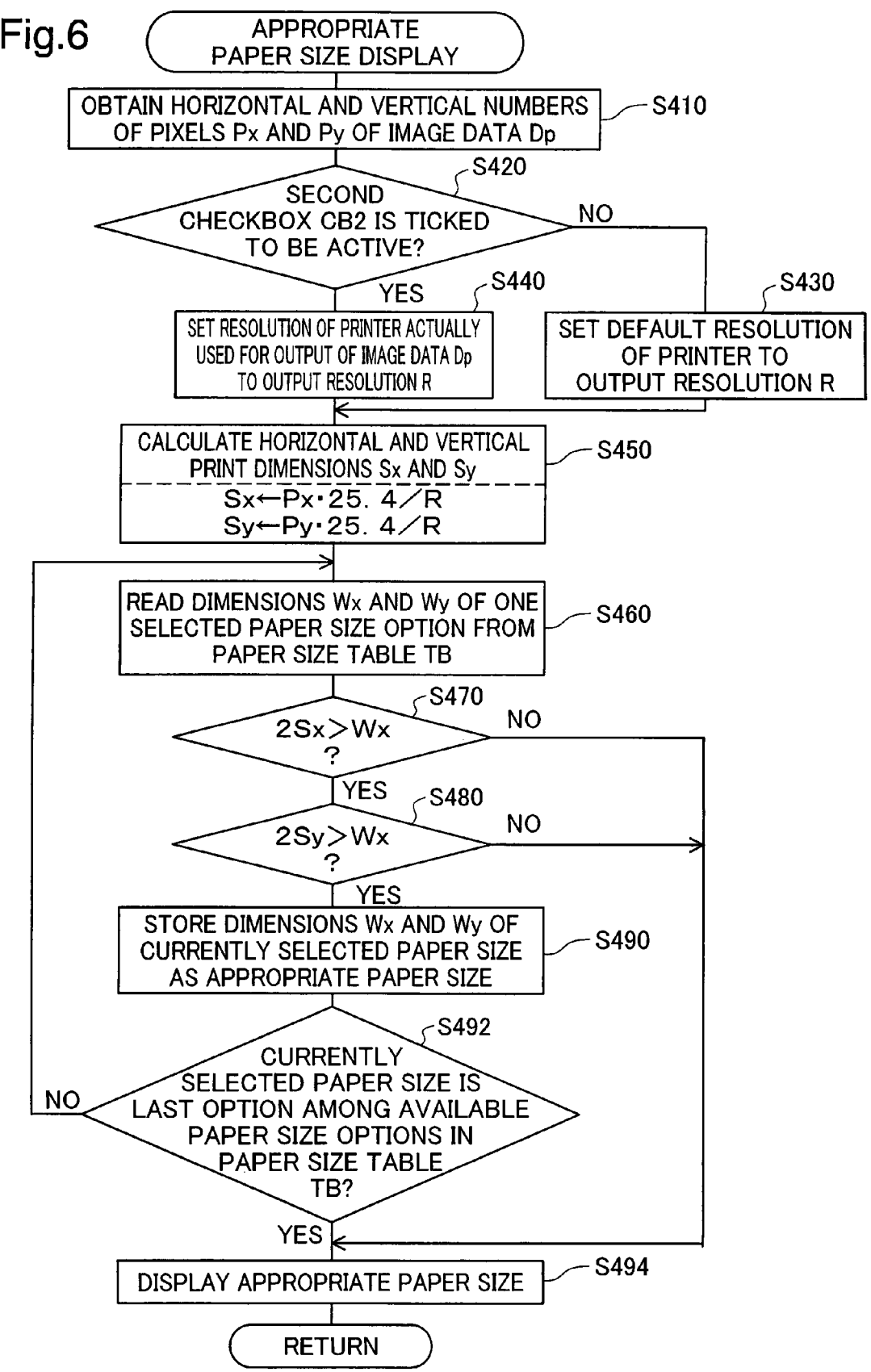
FIG. 6 is a flowchart showing the details of the appropriate paper size display at step S400 in the thumbnail display routine of FIG. 4.

FIG. 6 is a flowchart showing the details of the appropriate paper size display at step S400 in the thumbnail display routine of FIG. 4. In the appropriate paper size display process of FIG. 6, the CPU 11 first obtains a horizontal number of pixels Px and a vertical number of pixels Py of the selected target image data Dp (step S410). The image data Dp is defined by the horizontal number of pixels Px in the horizontal direction or x-axis direction and by the vertical number of pixels Py in the vertical direction or y-axis direction. The CPU 11 then identifies whether the operator ticks a second checkbox CB2 (described later) to be active in an 'Environmental Setting' dialog box DB (step S420).

Figures 7, 8:
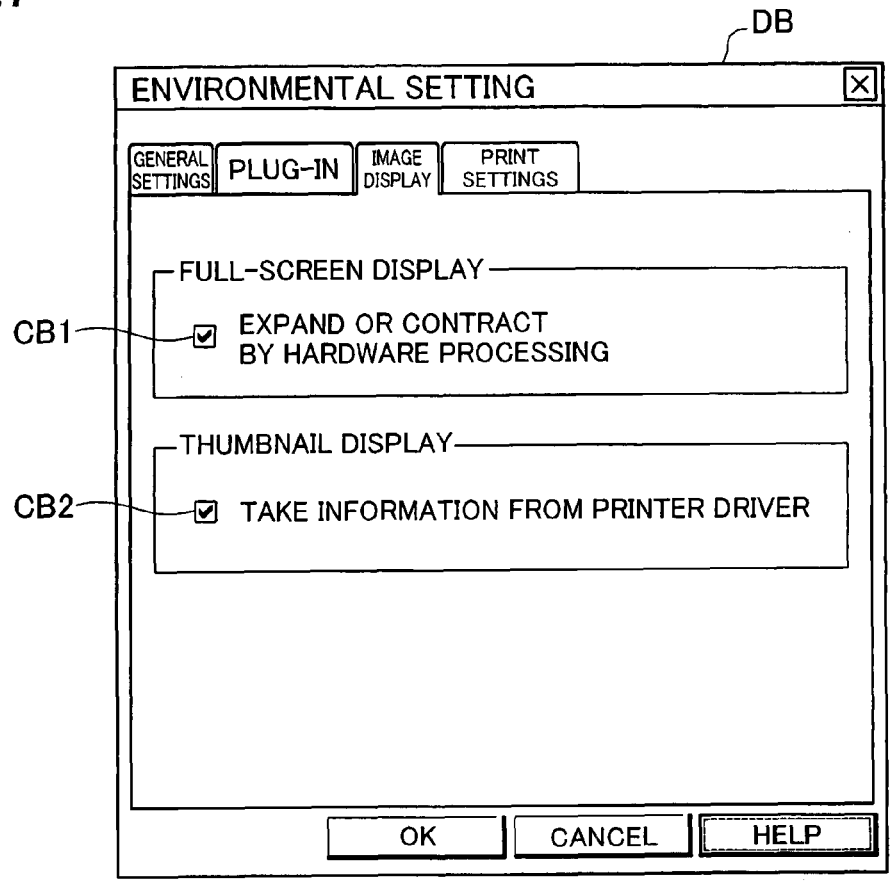
FIG. 7 shows an 'Environmental Setting' dialog box DB.
FIG. 8 shows one example of a paper size table TB.

FIG. 7 shows the 'Environmental Setting' dialog box DB. The 'Environmental Setting' dialog box DB is opened when the operator selects the 'Files' menu on the menu bar FL1 (see FIG. 2) to open a pulldown menu and clicks an option menu 'Environmental Setting' in the pulldown menu. The 'Environmental Setting' dialog box DB has plural tabs 'General Settings' 'Plug-In', 'Image Display', and 'Print Settings'. The 'Image Display' tab has a first checkbox CB1 for the full-screen display and a second checkbox CB2 for the thumbnail display. The second checkbox CB2 is the target of the identification at step S420 and is allocated to an option 'Take Information from Printer Driver'. Namely the second checkbox CB2 is ticked to take information from the printer driver for specification of the output resolution of a printer. The first checkbox CB1 is not directly related to the characteristic of the present invention and is thus not described in the specification hereof.

With referring back to the flowchart of FIG. 6, upon identification of the operator's no tick of the second checkbox CB2 to be inactive at step S420, the CPU 11 sets a default resolution of a printer to an output resolution R at step S430. The default resolution has been specified in advance by the program and is, for example, 300 [dpi].

Upon identification of the operator's tick of the second checkbox CB2 to be active at step S420, on the other hand, the CPU 11 sets the resolution of the printer 28 actually used for output of the image data Dp to the output resolution R at step S440. The resolution of the printer 28 actually used for output of the image data Dp is specified according to information sent back from the operating system in response to an inquiry for the current printing-related settings (printing quality-related settings) with regard to the printer selected as the current output destination. The printer driver specifies the printer as the output destination of the image data and the printing-related settings of the specified printer. In response to output of an adequate parameter (argument) to the operating system, a function of an API (application program interface) is called to receive information regarding the printer specified by the printer driver and the printing-related settings of the specified printer. The CPU 11 determines the resolution of the printer used as the output destination of the image data, based on the received information.

The printing quality-related settings include, for example, the setting of paper type and the setting of print mode (fine print mode or fast print mode). In the printer having these printing quality-related settings, for example, the resolution of 360 [dpi] is set to the output resolution R for the combination of the paper type 'plain paper' with the print mode 'fast', and the resolution of 720 [dpi] is set to the output resolution R for the combination of the paper type 'super fine paper' with the print mode 'fine'. Some type of the printer driver is capable of directly specifying the resolution. The CPU 11 may directly make inquiry about the resolution of the printer to this type of printer driver and set the resolution given as the response to the inquiry to the output resolution R.

After the setting of the output resolution R at step S430 or at step S440, the CPU 11 calculates horizontal and vertical print dimensions Sx and Sy from the horizontal and vertical numbers of pixels Px and Py specified at step S410 and the output resolution R set at step S430 or at step S440 according to Equations (1) and (2) given below (step S450):

$$Sx = Px \div R \times 25.4 \text{ mm} \quad (1)$$

$$Sy = Py \div R \times 25.4 \text{ mm} \quad (2)$$

The horizontal print dimension Sx in the horizontal direction and the vertical print dimension Sy in the vertical direction determine the print size for the image data Dp defined by the horizontal number of pixels Px and the vertical number of pixels Py specified at step S410. Both the horizontal and vertical print dimensions Sx and Sy are expressed in the unit of millimeter (mm).

In the appropriate paper size display process of this embodiment, the output resolution set at step S430 or at step S440 has the same value in the horizontal direction and in the vertical direction. Some type of the printer may have different resolutions set in the horizontal direction and in the vertical direction. In the case of this type of printer, a horizontal output resolution Rx in the horizontal direction is substituted into the output resolution R in Equation (1), and a vertical output resolution Ry in the vertical direction is substituted into the output resolution R in Equation (2).

FIG. 8 shows one example of the paper size table TB. The paper size table TB is generated and stored in the RAM 14 on the start of the computer program Pr. As illustrated, the paper size table TB has a 'paper size' field and a 'dimensions' field. Each paper size option is recorded with the dimensions specified in the unit of millimeters. In the illustrated example of FIG. 8, there are six paper size options 'L', 'Postcard', 'A6', '2L', 'B5', and 'A4' recorded with the respectively specified dimensions. The paper size option having the smaller dimensions is recorded as the upper option. These six paper size options are only illustrative, and the paper size table TB may have additional or different paper size options recorded with the dimensions.

Referring back to the appropriate paper size display process of FIG. 6, the CPU 11 reads a horizontal dimension Wx (in the horizontal direction or x-axis direction) and a vertical dimension Wy (in the vertical direction or y-axis direction) of one selected paper size option from the paper size table TB (step S460). One paper size is selected sequentially from the upper paper size option to the lower paper size option in the paper size table TB.

The CPU 11 then determines whether a 2-fold value 2Sx of the horizontal print dimension Sx calculated at step S450 is greater than the horizontal dimension Wx of the selected paper size read at step S460 (step S470), and determines whether a 2-fold value 2Sy of the vertical print dimension Sy calculated at step S450 is greater than the vertical dimension Wy of the selected paper size read at step S460 (step S480).

The horizontal and vertical print dimensions Sx and Sy calculated at step S450 define a print size of the image data Dp printed by the printer as the current output destination. The image data Dp may be expanded to a greater print size by pixel interpolation. For example, the bicubic method as the high-quality interpolation technique enables expansion of image data to an approximately 2-fold print size. When image data as an object of printing has the smaller number of pixels than the number of pixels in a selected paper size, the image data may be automatically expanded by pixel interpolation. The appropriate paper size display process of this embodiment thus compares the 2-fold horizontal and vertical print dimensions 2Sx and 2Sy with the horizontal and vertical dimensions Wx and Wy of the selected paper size at steps S470 and S480.

When both steps S470 and S480 give an affirmative answer, the print size is greater than the paper size. This means that the target image data Dp has a sufficient number of pixels to be printed in the paper size selected at step S460. The horizontal and vertical dimensions Wx and Wy of the currently selected paper size are thus temporarily stored as the appropriate paper size in the RAM 14 (step S490). The CPU 11 then determines whether the currently selected paper size is the last option among the available paper size options in the paper size table TB (step S492). When the currently selected paper size is not the last option (step S492: no), the appropriate paper size display process goes back to step S460 to read the horizontal and vertical dimensions Wx and Wy of a next paper size option from the paper size table TB. The repeated processing of steps S470 to S492 sequentially updates the appropriate paper size stored in the RAM 14 at step S490 to the paper size of the greater dimensions among those sufficient for printing the target image data Dp having the specified numbers of pixels Px and Py.

When at least either of steps S470 and S480 gives a negative answer, on the other hand, the print size is smaller than the paper size. This means that the target image data Dp has only an insufficient number of pixels to be printed in the paper size selected at step S460. The CPU 11 accordingly skips the processing of steps S490 and S492 and goes to step S494. The paper size options are arranged in the ascending order of the dimensions in the paper size table TB as mentioned above. Namely the later read-out paper size option has the greater dimensions. In the case of the negative answer at either step S470 or step S480, it is obvious that the target image data Dp has the insufficient number of pixels for all the remaining paper size options in the paper size table TB. The appropriate paper size display process thus skips the unnecessary processing of steps S490 and S492 and goes to step S494. The paper size stored in the RAM 14 as the appropriate paper size accordingly has the greatest dimensions among those sufficient for printing the target image data Dp having the specified numbers of pixels Px and Py. The 'appropriate paper size' of this embodiment is equivalent to the 'paper size adequate for printing the image data' in the invention.

When the currently selected paper size is the last option (step S492: yes), the appropriate paper size display process goes to step S494 to display the appropriate paper size stored in the RAM 14. The appropriate paper size is displayed in the display box PS shown in FIG. 5, that is, on the upper right corner of the thumbnail TN. When the target image data Dp has an extremely small number of pixels and is insufficient for any paper size recorded in the paper size table, the negative answer is given for the first paper size option at either step S470 or step S480. In this case, no appropriate paper size is determined and the display box PS is kept null or vacant. After execution of step S494, the appropriate paper size display process goes to Return and is terminated.

As the result of the thumbnail display routine, multiple thumbnails TN provided for the respective image data Dp are displayed in the thumbnail display area FL13 as shown in FIG. 3. The appropriate paper size PS is shown on the upper right corner of each thumbnail TN. The appropriate paper size PS of each thumbnail TN is suitable for the horizontal and vertical print dimensions Sx and Sy to print the image data Dp corresponding to the thumbnail TN. The appropriate paper size PS represents the paper size option of the greatest dimensions among the paper size options in the paper size table TB that are sufficient for printing the target image data Dp having the specified numbers of pixels Px and Py. For example, when the horizontal and vertical print dimensions Sx and Sy of target image data Dp are 200×140 [mm], the number of pixels of the target image data Dp is insufficient for the paper size option 'B5' but is sufficient for the immediately upper paper size option '2L' in the paper size table TB of FIG. 8. The paper size '2L' is accordingly displayed as the appropriate paper size PS for the target image data Dp. The display box PS shows the appropriate paper size like 'L', '2L', or 'A4'.

The processing of step S410 in the appropriate paper size display process (FIG. 6) corresponds to the image size acquisition module 30 (FIG. 1). The processing of steps S420 to S440 in the appropriate paper size display process corresponds to the output resolution acquisition module 31. The processing of steps S450 to S492 in the appropriate paper size display process corresponds to the appropriate paper size determination module 32. The processing of step S494 in the appropriate paper size display process and the processing of step S200 in the thumbnail display routine (FIG. 4) correspond to the display control module 33.

D. Functions and Effects

As described above, the thumbnail display process of the embodiment displays the appropriate paper size PS with each thumbnail TN. This informs the operator of the paper size suitable for printing the image data Dp corresponding to each thumbnail TN. The operator generally has difficulty in understanding the actual size of image data by the number of pixels. The information on the paper size suitable for printing the image data helps the operator grasp the actual size of the image data.

In this embodiment, the display of each thumbnail TN with the appropriate paper size PS enables the operator to readily grasp the number of pixels constituting each image data Dp corresponding to the thumbnail TN. The operator is only required to check the list of thumbnails TN displayed in the thumbnail display area FL13. The operator is then readily informed of, for example, that image data Dp corresponding to one thumbnail TN has a high pixel number or that image data Dp corresponding to another thumbnail TN has a low pixel number and is taken with a camera-equipped cell phone. The display of the appropriate paper size PS prevents the operator from wastefully clicking a thumbnail TN having an insufficiently low pixel number and enhances the workability for selection of desired image data Dp.

The structure of the embodiment enables the operator to change over the output resolution R corresponding to the printing resolution by the printing apparatus between the default resolution and the resolution of the printer actually used for output of image data according to the printing-related settings specified by the printer driver. The operator can thus adequately select either the highly accurate specification or the rough specification of the appropriate paper size according to the requirements. This function improves the convenience of the thumbnail display.

E. Modifications (1) In the thumbnail display apparatus of the embodiment, the second checkbox CB2 (see FIG. 7) is used to change over the setting of the output resolution R between the default resolution and the resolution of the printer actually used for output of image data according to the printing-related setting specified by the printer driver. The output resolution R may, however, be unchangeable and fixed to one of these settings. The thumbnail display apparatus may have the output resolution R fixed to the default resolution or may have the output resolution R fixed to the resolution of the printer actually used for output of image data according to the printing-related settings specified by the printer driver. The technique of specifying the resolution of the printer as the output destination is not restricted to the procedure described in the embodiment, that is, the procedure of giving an adequate parameter (argument) to the operating system to call the function of an API (application program interface). The printing-related settings specified by the printer driver may be directly read from the operating system. Any other suitable technique may be adopted to specify the resolution of the printer as the output destination.

(2) In the thumbnail display apparatus of the embodiment, the appropriate paper size PS is used only for display of each thumbnail TN. The appropriate paper size PS may additionally be set in the printer driver as the paper size for printing image data, which is displayed in the full size in response to selection of a desired thumbnail TN.

(3) In the thumbnail display apparatus of the embodiment, the appropriate paper size PS displayed with each thumbnail TN is expressed by a letter or character string like 'L', 'Postcard', or 'A4'. Some of the paper sizes may be expressed by illustration; for example, the paper size 'Postcard' may be expressed by illustration of a postcard.

(4) The thumbnail display apparatus of the embodiment uses the paper size table TB stored in the RAM 14 and reads the paper size option suitable for printing each image data from the paper size table TB. The paper size table TB may not be stored in the RAM 14 but may be provided by a sequence recorded in the computer program Pr.

(5) The image data processed in the thumbnail display apparatus of the embodiment are color photographic image data. This is, however, not essential, but the technique of the invention is applicable to process diversity of image data including black and white image data and pattern image data.

In accordance with other aspects of the invention, the thumbnail display apparatus of the first aspect of the invention may have any of various configurations and arrangements described below.

In one preferable embodiment of the thumbnail display apparatus, the appropriate paper size determination module includes: a paper size storage module that stores multiple paper size options; a print size computation module that computes an available print size for printing each image data by a printing apparatus from the image size of the image data and the output resolution; and a paper size selection output module that selects an optimum paper size most suitable for the print size computed by the print size computation module, among the multiple paper size options stored in the paper size storage module, and outputs the selected paper size as the appropriate paper size for printing.

The thumbnail display apparatus of this embodiment first computes the available print size for printing each image data by a printing apparatus and then selects the optimum paper size most suitable for the print size among the multiple paper size options stored in the paper size storage module. This arrangement readily determines the appropriate paper size suitable for printing the image data.

In the thumbnail display apparatus of this embodiment, the print size computation module may multiply the image size of each image data specified by the image size acquisition module by a preset value and use the multiplied image size for computation of the print size. Here the preset value is greater than 1 and is determined by taking into account potential pixel interpolation.

The appropriate paper size displayed with each thumbnail is determined by taking into account the potential expansion of image data by the pixel interpolation technique, for example, by the known bicubic method.

In another preferable embodiment of the thumbnail display apparatus of the first aspect of the invention, the output resolution acquisition module includes: a printing apparatus specification module that specifies a printing apparatus as an output destination of image data; and a printing apparatus resolution acquisition module that obtains a resolution set in a printing apparatus specified by the printing apparatus specification module as the output resolution.

The resolution of a printing apparatus specified as the output destination is used to determine the appropriate paper size for each thumbnail. This arrangement desirably enhances the accuracy of the appropriate paper size displayed with each thumbnail.

In the thumbnail display apparatus of this embodiment, the output resolution acquisition module may include: a default acquisition module that obtains a preset default value as the output resolution; and an active operation switchover module that selectively activates either the printing apparatus resolution acquisition module or the default acquisition module, in response to an operator's activation command.

The thumbnail display apparatus of this arrangement obtains the default setting by the simple structure of the default acquisition module. The appropriate paper size determined according to this default setting may not represent the actual printable size. The operator is informed of the rough estimation of the paper size for printing image data corresponding to the thumbnail. This arrangement enables selective activation of either the printing apparatus resolution acquisition module for the highly accurate specification of the appropriate paper size or the default acquisition module for only the rough specification of the appropriate paper size, in response to the operator's requirement. This function improves the convenience of the thumbnail display.

In one preferable embodiment of the invention, a list of multiple thumbnails with respective appropriate paper sizes determined by the appropriate paper size determination module is displayed.

The embodiment and its modifications discussed above are to be considered in all aspects as illustrative and not restrictive. There may be many other modifications, changes, and alterations without departing from the scope or spirit of the main characteristics of the present invention. The scope and spirit of the present invention are indicated by the appended claims, rather than by the foregoing description.

What is claimed is:

1. A thumbnail display apparatus that displays a thumbnail provided for each image data, the thumbnail display apparatus comprising:

an image size acquisition module that obtains a horizontal number of pixels and a vertical number of pixels defining each image data as an image size of the image data;

an output resolution acquisition module that specifies an output resolution corresponding to a printing resolution by a printing apparatus;

an appropriate paper size determination module that determines an adequate paper size suitable for printing each image data, based on the specified image size of the image data and the specified output resolution;

a display control module that displays a thumbnail provided for each image data, together with the appropriate paper size determined for the image data by the appropriate paper size determination module; and a thumbnail list display module that displays a list of multiple thumbnails with respective appropriate paper sizes determined by the appropriate paper size determination module.

2. The thumbnail display apparatus in accordance with claim 1, wherein the appropriate paper size determination module includes:

a paper size storage module that stores multiple paper size options;

a print size computation module that computes an available print size for printing each image data by a printing apparatus from the image size of the image data and the output resolution; and a paper size selection output module that selects an optimum paper size most suitable for the print size computed by the print size computation module, among the multiple paper size options stored in the paper size storage module, and outputs the selected paper size as the appropriate paper size for printing.

3. The thumbnail display apparatus in accordance with claim 2, wherein the print size computation module multiplies the image size of each image data specified by the image size acquisition module by a preset value and uses the multiplied image size for computation of the print size, wherein the preset value is greater than 1 and is determined by taking into account potential pixel interpolation.

4. The thumbnail display apparatus in accordance with claim 1, wherein the output resolution acquisition module includes:

a printing apparatus specification module that specifies a printing apparatus as an output destination of image data; and a printing apparatus resolution acquisition module that obtains a resolution set in a printing apparatus specified by the printing apparatus specification module as the output resolution.

5. The thumbnail display apparatus in accordance with claim 4, wherein the output resolution acquisition module includes:

a default acquisition module that obtains a preset default value as the output resolution; and an active operation switchover module that selectively activates either the printing apparatus resolution acquisition module or the default acquisition module, in response to an operator's activation command.

6. A thumbnail display method of displaying a thumbnail provided for each image data, the thumbnail display method comprising:

obtaining a horizontal number of pixels and a vertical number of pixels defining each image data as an image size of the image data;

specifying an output resolution corresponding to a printing resolution by a printing apparatus;

determining an adequate paper size suitable for printing each image data, based on the specified image size of the image data and the specified output resolution; and displaying on a thumbnail display apparatus of a computer system a thumbnail provided for each image data, together with the appropriate paper size determined for the image data.

7. A non-transitory computer readable medium with a computer program product stored thereon that causes a computer to display a thumbnail provided for each image data, the computer program product comprising:

a first program code of obtaining a horizontal number of pixels and a vertical number of pixels defining each image data as an image size of the image data;

a second program code of specifying an output resolution corresponding to a printing resolution by a printing apparatus;

a third program code of determining an adequate paper size suitable for printing each image data, based on the specified image size of the image data and the specified output resolution; and a fourth program code of displaying a thumbnail provided for each image data, together with the appropriate paper size determined for the image data.

8. The computer readable medium in accordance with claim 7, the computer program product further comprising:

a fifth program code of providing a paper size table storing multiple paper size options, wherein the third program code includes:

a sixth program code of computing an available print size for printing each image data by a printing apparatus from the image size of the image data and the output resolution; and a seventh program code of selecting an optimum paper size most suitable for the computed print size among the multiple paper size options stored in the paper size table and outputting the selected paper size as the appropriate paper size for printing.

9. The computer readable medium in accordance with claim 7, wherein the second program code includes:

an eighth program code of specifying a printing apparatus as an output destination of image data; and a ninth program code of obtaining a resolution set in the specified printing apparatus as the output resolution.

10. The computer readable medium in accordance with claim 9, wherein the second program code includes:

a tenth program code of obtaining a preset default value as the output resolution; and an eleventh program code of selectively activating either the ninth program code or the tenth program code, in response to an operator's activation command.

\* \* \* \* \*